United States Patent
Wu et al.

(10) Patent No.: US 9,069,294 B1
(45) Date of Patent: Jun. 30, 2015

(54) TRANSFER ASSIST MEMBERS

(71) Applicant: Xerox Corporation, Norwalk, CT (US)

(72) Inventors: Jin Wu, Pittsford, NY (US); Kyle B. Tallman, Perry, NY (US); John J. Wilbert, Macedon, NY (US); Jonathan H. Herko, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/155,777

(22) Filed: Jan. 15, 2014

(51) Int. Cl.
  *G03G 15/20* (2006.01)
  *G03G 15/16* (2006.01)
  *C08L 63/00* (2006.01)
  *C08L 67/02* (2006.01)

(52) U.S. Cl.
  CPC .............. *G03G 15/162* (2013.01); *C08L 63/00* (2013.01); *C08L 67/02* (2013.01); *G03G 2215/1628* (2013.01)

(58) Field of Classification Search
  CPC .............................................. G03G 2215/1628
  USPC ........................................................... 399/310
  See application file for complete search history.

(56) References Cited

U.S. PATENT DOCUMENTS

| | | | | |
|---|---|---|---|---|
| 5,112,715 | A * | 5/1992 | DeMejo et al. ............. | 430/109.2 |
| 2010/0221651 | A1* | 9/2010 | Wu et al. ...................... | 430/58.8 |
| 2010/0248108 | A1* | 9/2010 | Wu et al. ...................... | 430/104 |
| 2011/0104479 | A1* | 5/2011 | Wu et al. ...................... | 428/334 |
| 2011/0244202 | A1* | 10/2011 | Wu et al. ...................... | 428/215 |
| 2012/0163158 | A1* | 6/2012 | Saito et al. ................... | 369/283 |
| 2013/0122420 | A1* | 5/2013 | Kato ........................... | 430/277.1 |
| 2013/0323994 | A1* | 12/2013 | Kiyoyanagi et al. .......... | 442/175 |

* cited by examiner

*Primary Examiner* — David Gray
*Assistant Examiner* — Tyler Hardman
(74) *Attorney, Agent, or Firm* — Eugene O. Palazzo

(57) ABSTRACT

A transfer assist member comprising a plurality of layers, at least one of the layers being a check film layer comprised of a crosslinked mixture of an epoxy resin and a carboxylated polyester.

20 Claims, 4 Drawing Sheets

TRANSFER ASSIST MEMBERS

This disclosure is generally directed to transfer assist members comprised of a plurality of layers, one of which layers is a check film layer comprised of a crosslinked layer of an epoxy resin and carboxylated polyester resin.

BACKGROUND

In the process of xerography, a light image of an original to be copied is typically recorded in the form of a latent electrostatic image upon a photosensitive or a photoconductive member with subsequent rendering of the latent image visible by the application of particulate thermoplastic material, commonly referred to as toner. The visual toner image can be either fixed directly upon the photosensitive member or the photoconductor member, or transferred from either member to another support, such as a sheet of plain paper, with subsequent affixing by, for example, the application of heat and pressure of the image thereto.

To affix or fuse toner material onto a support member like paper by heat and pressure, it is usually necessary to elevate the temperature of the toner and simultaneously apply pressure sufficient to cause the constituents of the toner to become tacky and coalesce. In both the xerographic as well as the electrographic recording arts, the use of thermal energy for fixing toner images onto a support member is known.

One approach to the heat and pressure fusing of toner images onto a support has been to pass the support with the toner images thereon between a pair of pressure engaged roller members, at least one of which is internally heated. For example, the support may pass between a fuser roller and a pressure roller. During operation of a fusing system of this type, the support member to which the toner images are electrostatically adhered is moved through the nip formed between the rollers with the toner image contacting the fuser roll thereby to effect heating of the toner images within the nip.

The process of transferring charged toner particles from an image bearing member marking device, such as a photoconductor, to an image support substrate like a sheet of paper involves overcoming cohesive forces holding the toner particles to the image bearing member. The interface between the photoconductor surface and image support substrate may not in many instances be optimal or may be inconsistent, thus, in the transfer process when spaces or gaps exist between the developed image and the image support substrate the quality of the image may not be acceptable. One aspect of the transfer process is focused on the application and maintenance of high intensity electrostatic fields in the transfer region for overcoming the cohesive forces acting on the toner particles as they rest on the photoconductive member. Careful and somewhat costly control of the electrostatic fields and other forces present can be required to induce the physical detachment and transfer of the charged toner particles without scattering or smearing of the developer material.

In general, transfer of developed toner images in electrostatographic applications has been accomplished via electrostatic induction using a corona generating device, wherein the image support substrate is placed in direct contact with the developed toner image on the photoconductive surface while the reverse side of the image support substrate is exposed to a corona discharge. This corona discharge generates ions having a polarity opposite that of the toner particles, thereby electrostatically attracting and transferring the toner particles from the photoreceptive member to the image support substrate.

More specifically, in the xerographic electrostatic transfer of the toner powder image to the copy sheet, it is necessary for the copy sheet to be in uniform intimate contact with the toner powder image developed on the photoconductive surface. In particular, non-flat or uneven image support substrates, such as copy sheets that have been mishandled, left exposed to the environment or previously passed through a fixing operation, such as heat and/or pressure fusing, tend to promulgate imperfect contact with the surface of the photoconductor. Further, in the event the copy sheet is wrinkled, the sheet will usually not be in intimate contact with the photoconductive surface and spaces, or air gaps, as illustrated herein, will materialize between the developed image on the photoconductive surface and the copy sheet. When spaces or gaps exist between the developed image and the copy substrate, there is a tendency for toner not to transfer across these gaps causing variable transfer efficiencies, and where areas of low or no transfer results in a phenomenon known as image transfer deletion.

Image transfer deletion is undesirable in that portions of the desired image may not be appropriately reproduced on the print sheet in that the area of the cleaning blade that contacts the photoreceptor and the cleaning blade will in most instances pick up residual dirt and toner from the photoreceptor surface. Therefore, in the next printing cycle the printed sheets with developed images thereon, the residual dirt present on the transfer assist blade is transferred to the back side of the print sheets resulting in unacceptable print quality defects.

The use of a known transfer assist blade incorporates melamine formaldehyde resins, where the formaldehyde, which can be emitted during curing, has been classified by the United States Environmental Protection Agency (EPA) as a known human carcinogen, and where the EPA has positioned formaldehyde with similar risk values as other human carcinogens such as benzene, butadiene, and vinyl chloride.

With the advent of multicolor electrophotography, it is desirable to use an architecture which comprises a plurality of image forming stations. One example of the plural image forming station architecture utilizes an image-on-image (IOI) system in which the photoreceptive member is recharged, reimaged and developed for each color separation. This charging, imaging, developing and recharging, reimaging and redeveloping, all followed by transfer to paper, can be completed in a single revolution of the photoreceptor in so-called single pass machines, while multipass architectures form each color separation with a single charge, image and develop, with separate transfer operations for each color.

Mechanical devices, such as rollers, have been used to force the image support substrate into intimate and substantially uniform contact with the image bearing surface. For example, there can be selected an electrically biased transfer roll system in an attempt to minimize image deletions. In other electrophotographic printing machines, such as the color producing Xerox Corporation 1065 machine, the copy sheet is provided with a precisely controlled curvature as it enters the transfer station for providing enhanced contact pressure.

In single pass color machines, it is desirable to cause as little disturbance to the photoreceptor as possible so that motion errors are not propagated along the belt to cause image quality and color separation registration problems. One area that has potential to cause such a disturbance is when a sheet is released from the guide after having been brought into contact with the photoreceptor for transfer of the developed image thereto. This disturbance, which is often referred to as trail edge flip, can cause image defects on the sheet due to the motion of the sheet during transfer caused by energy released due to the bending forces of the sheet. Particularly in copying and printing machines which handle a large range of paper weights and sizes, it is difficult to have a sheet guide which can properly position any weight and size sheet while not causing the sheet to oscillate after having come in contact with the photoreceptor.

There is a need for members and processes that substantially avoid or minimize the disadvantages illustrated herein.

Also, there is a need for transfer assist members that are wear resistant and that can be used for extended time periods without being replaced.

Further, there is a need for transfer assist members that are environmentally acceptable and that are formaldehyde free.

There is also a need for toner developed image transfer assist members that permit the continuous contact between a photoconductor and the substrate to which the developed toner image is to be transferred, and an apparatus for enhancing contact between a copy sheet and a developed image positioned on a photoconductive member.

Yet another need resides in providing xerographic printing systems, inclusive of multi-color generating systems, where there is selected a transfer assist member that maintains sufficient constant pressure on the substrate to which a developed image is to be transferred and to substantially eliminate air gaps between the substrate and the photoconductor in that the presence of air gaps can cause air breakdown in the transfer field.

Further, there is a need for transfer assist members that enable suitable and full contact of the developed toner image present on a photoconductor and a substrate to which the developed image is to be transferred.

Additionally, there is a need for transfer assist members that contain durable formaldehyde free compositions that can be economically and efficiently manufactured, and where the amount of energy consumed is reduced.

Yet additionally there is a need for a multilayered transfer assist member that includes as one layer a check film on the side exposed to a dicorotron/corona, and which member possesses excellent resistance characteristics.

Also, there is a need for transfer assist members where the check film layer thereof can be generated by economical extrusion processing.

Further, there is a need for transfer assist members with a combination of excellent durability that exert sufficient constant pressure on a substrate sheet and permit the substrate to fully contact the toner developed image on a photoconductor, which members provide mechanical pressure, about 20 percent of its function and electrostatic pressure/tailoring about 80 percent of its function, and where complete transfer to a sheet of a toner developed image from a photoconductor results, such as for example, about 90 to about 100 percent, from about 90 to about 98 percent, from about 95 to about 99 percent, and in embodiments about 100 percent of the toner developed image is transferred to the sheet or a substrate, and wherein blurred final images are minimized or avoided.

Moreover, there is a need for composite transfer assist blades that overcome or minimize the problems associated with a single component blade, as a single component blade in order to be flexible enough to prevent image damage does not provide enough contact force to the back of the sheet to enable complete image transfer giving rise to transfer deletions and color shift.

Yet, there is another need for transfer assist members that include check films, and which members are useful in electrophotographic imaging apparatuses, including digital printing where the latent image is produced by a modulated laser beam, or ionographic printing, and where charges are deposited on a charge retentive surface in response to electronically generated or stored images.

Additionally, there is a need for a xerographic system containing an improved transfer assist blade (TAB) which is used in conjunction with a corona device to perform transfer, such as by effectively moving toner from a photoconductor media, and where the TAB functions to provide mechanical pressure and electrostatic pressure/tailoring, with the electrostatic pressure/tailoring being achieved by utilizing a check film comprising the disclosed crosslinked layer mixture on a supporting substrate.

These and other needs are achievable in embodiments with the transfer assist members and components thereof disclosed herein.

SUMMARY

Disclosed is a transfer assist member comprising a plurality of layers, one of the layers being a check film layer comprised of a crosslinked mixture of an epoxy resin and a carboxylated polyester.

Also disclosed is a composite toner transfer assist blade comprising a plurality of bonded layers inclusive of a bonded check film layer comprised of a crosslinked layer mixture of epoxy resins and carboxylated polyesters contained on a polymer layer substrate of a polyalkylene terephthalate, a polyester, or mixtures thereof, wherein the epoxy resin is a bisphenol A glycidyl ether derived from the reaction of epichlorohydrin and bisphenol A, and the carboxylated polyester is comprised of reaction products of diethylene glycol, neopentyl glycol, terephthalic acid and trimellitic acid, and further including conductive components, catalysts, optional silicas, leveling agents, optional plasticizers, and optional fluoropolymer particles of tetrafluoroethylene polymers, trifluorochloroethylene polymers, hexafluoropropylene polymers, vinyl fluoride polymers, vinylidene fluoride polymers, difluorodichloroethylene polymers, polysiloxane polymers, and mixtures thereof.

There is further disclosed a xerographic process for providing substantially uniform contact between a copy substrate and a toner developed image located on an imaging member, comprising providing the contact by using a toner transfer flexible assist blade that comprises a plurality of adhesive bonded layers, wherein the flexible transfer assist blade is adapted to move from a non-operative position spaced from the imaging member to an operative position in contact with the copy substrate on the imaging member, applying pressure against the copy substrate in a direction toward the imaging member, and wherein the plurality of layers comprises at least one of a check film layer comprised of a crosslinked mixture of epoxy resins and carboxylated polyesters present on a polymer substrate of a polyalkylene terephthalate, a polyester, or mixtures thereof, and the crosslinked epoxy resins and carboxylated polyesters mixture layer further includes at least one of a conductive component, a silica, a plasticizer, a catalyst of an amine, a phosphonium, a zinc complex or mixtures thereof, a fluoropolymer, a leveling agent and mixtures thereof, and optionally curing the mixture thereby resulting in a crosslinking value of from about 75 to about 100 percent.

FIGURES

The following figures are provided to further illustrate the transfer assist members disclosed herein, and where the arrows when present illustrate the direction of movement of the various components shown.

EMBODIMENTS

The disclosed transfer assist members comprise an optional supporting substrate, such as a polymer and a crosslinked overcoat layer comprised of an epoxy resin and a carboxylated polyester resin, and where the members apply pressure against a copy substrate like a sheet of paper to create uniform contact between the copy substrate and a developed image formed on an imaging member like a photoconductor. The transfer assist member, such as for example a blade, presses the copy sheet into contact with at least the developed image on the photoconductive surface to substantially eliminate any spaces or gaps between the copy sheet and the developed image during transfer of the developed image from the photoconductive surface to the copy substrate.

Figure 1:
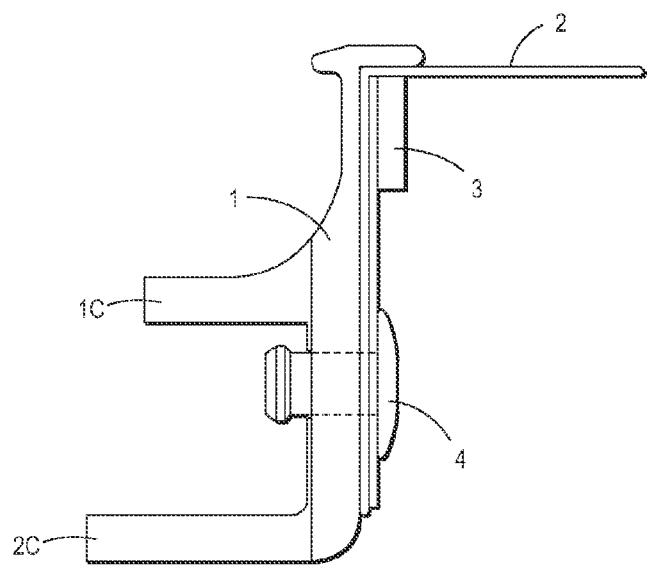
FIG. 1 and FIG. 1A illustrate exemplary side views of the transfer assist member of the present disclosure.

FIG. 1 illustrates a side view of the transfer assist member assembly of the present disclosure. More specifically, illustrated in FIG. 1 is an aluminum component 1 to secure the member, such as a blade (illustrated herein by the transfer assist member petal assembly 2), and which component 1 is attached to the transfer assist member petal assembly 2, and where the petal assembly 2 is comprised of the multi-layer blade member as shown in FIG. 3, and where the numeral or designation 3 (shown in FIGS. 1, 1A and 2) represents a stainless steel clamp, and the designation 4 (shown in FIGS. 1, 1A and 2), represents an aluminum rivet, whereby the clamp 3 and rivet 4 retain in position the petal assembly 2, between clamp 3, and the aluminum component 1, and where 1C and 2C represent spaced-apart integral arms of aluminum component 1.

Figure 1A:
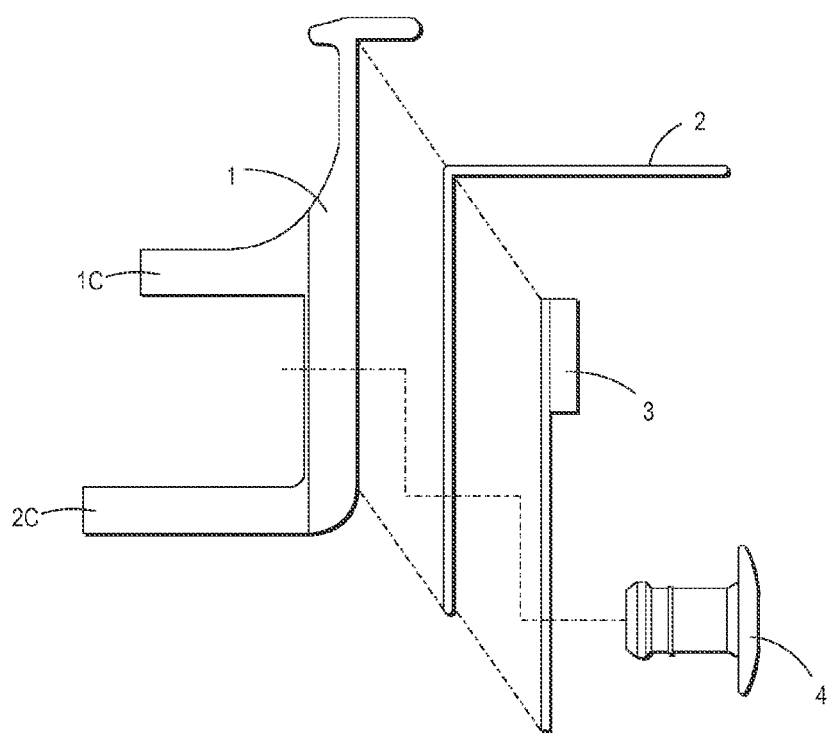

The corresponding FIG. 1A illustrates the disassembled elements or form of the transfer assist members of the present disclosure where the designations 1, 2, 3, 4, 1C and 2C for this FIG. 1A are the same as those designations as shown in FIG. 1.

Figure 2:
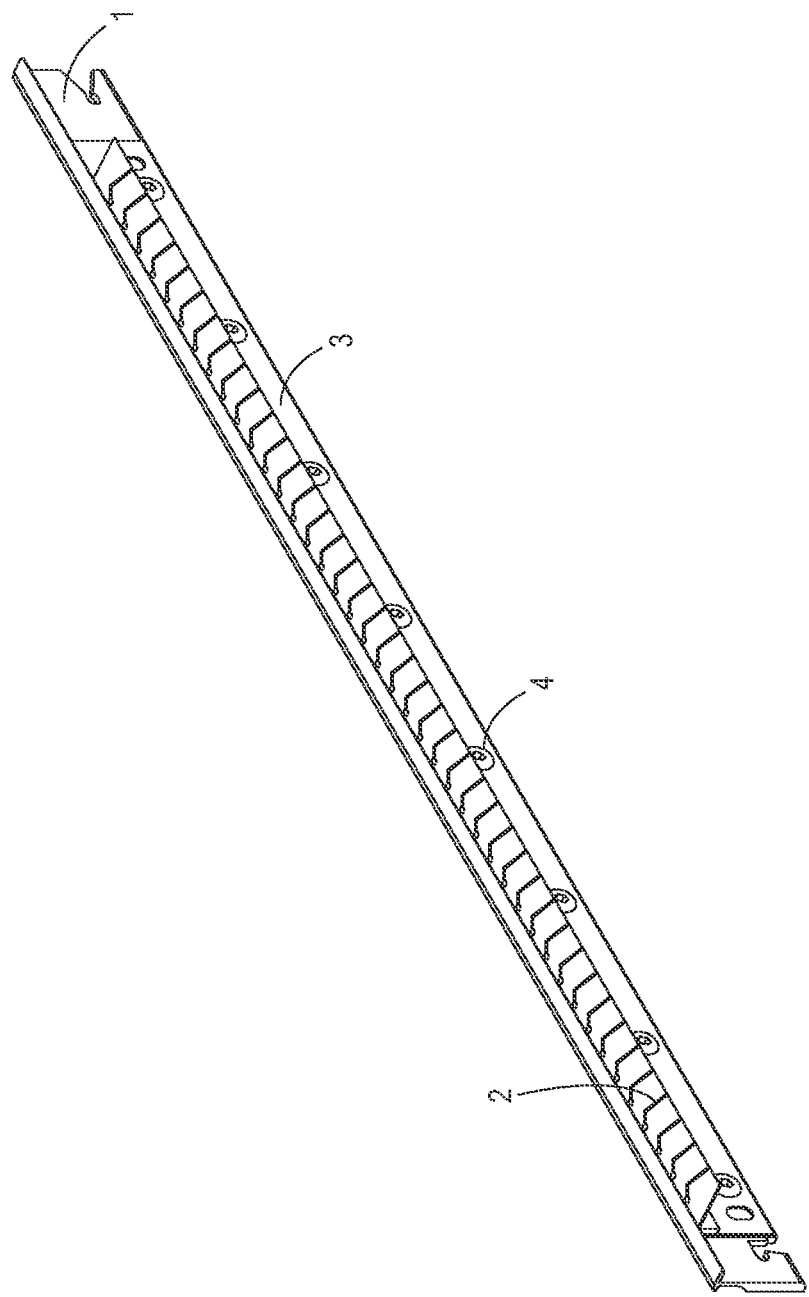
FIG. 2 illustrates an exemplary view of the transfer assist member assembly of the present disclosure.
Figure 3:
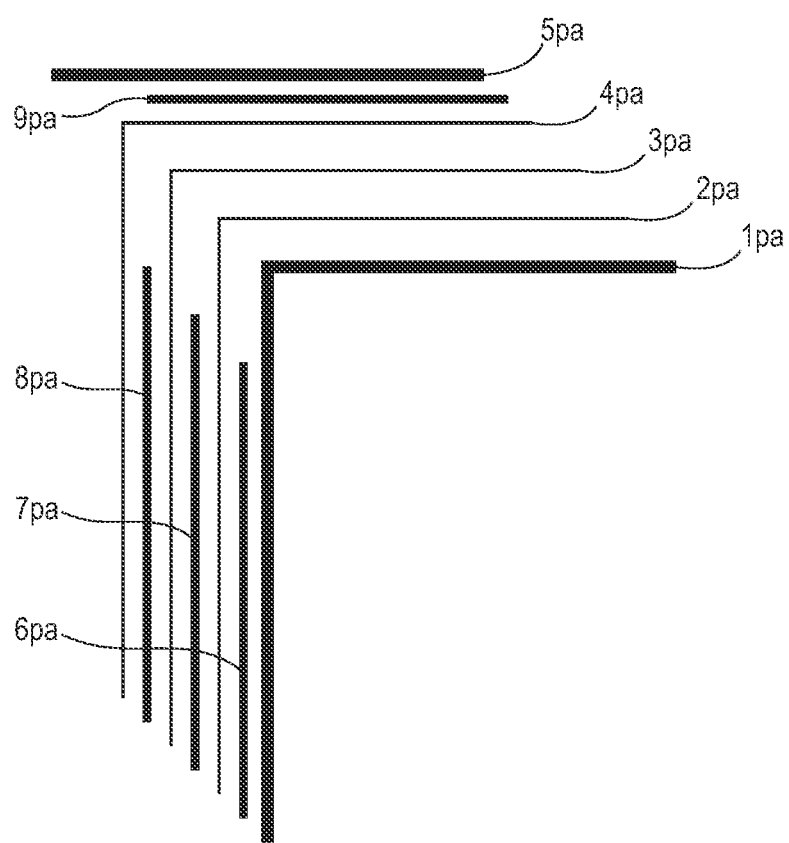
FIG. 3 illustrates an exemplary view of the transfer assist member petal of the present disclosure.

FIG. 2 illustrates another view of the transfer assist member assembly of the present disclosure, and where the designations 1, 2, 3, and 4 for this Figure are the same as the designations as presented in FIG. 1, that is there is shown an aluminum component 1 to secure the member, such as a blade, which blade is generated, for example, by extrusion processes, to the transfer assist member petal assembly 2, and where the petal assembly 2 comprises the multi-layer blade member as shown in FIG. 3, and where numeral or designation 3 represents a stainless steel clamp, and designation 4 represents an aluminum rivet, and which clamp and rivet retain in position the petal assembly 2, between designations 3 and 1.

FIG. 3 illustrates the components and compositions of the transfer assist member petal assembly of the present disclosure. More specifically, shown in FIG. 3 is an embodiment of the transfer assist member petal assembly 2 of the present disclosure. Specifically, the transfer assist member petal assembly 2 (shown in FIGS. 1, 1A and 2) comprises the check film layer 1pa, which itself comprises a polymer substrate and a crosslinked polymer formed from the reaction of an epoxy resin and carboxylated polyester, and wherein embodiments layer 1pa is comprised of two inseparable layers. The transfer assist member petal assembly 2 further includes a top wear resistant layer 5pa, and may also include optional adhesive layers 6pa, 7pa, 8pa and 9pa between the respective pairs of layers 1pa and 2pa, 2pa and 3pa, 3pa and 4pa, 4pa and 5pa, as shown in FIG. 3.

The layers 2pa, 3pa and 4pa are comprised of suitable polymers, such as for example, MYLAR®, MELINEX®, TEIJIN®, TETORON®, and TEONEX®, considered to be bi-axially oriented polyester films which are commercially available in a variety of finishes and thicknesses. These and other similar polymers that can be slected are available from E.I. DuPont Company or SKC Incorporated. These layers are each of effective thicknesses of, for example, from about 1 to about 20 mils, from about 1 to about 12 mils, from about 5 to about 7 mils, and more specifically, about 5 mils where one mil is equal to 0.001 of an inch (0.0254 mm). The primary functions of layers 2pa, 3pa and 4pa are for providing for the mechanical integrity of the transfer assist member petal and the disclosed transfer assist members.

Figure 4:
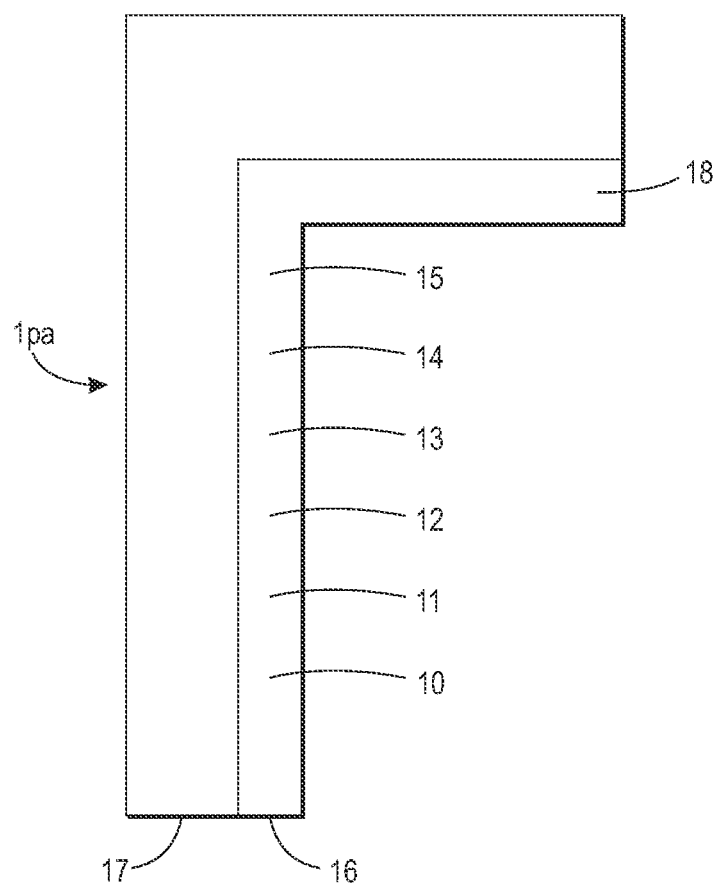
FIG. 4 illustrates an exemplary view of the check film or partially conductive film of the present disclosure.

FIG. 4 illustrates the components and compositions of the transfer assist member check components of the present disclosure. More specifically, shown in FIG. 4 is an embodiment of the check film 1pa comprised of supporting substrate layer 17, and a layer 16 comprised of a mixture of an epoxy resin and a carboxylated polyester 10, catalysts 11, conductive components or fillers 12, optional silicas 13, optional fluoropolymer particles 14, optional plasticizers 15, and optional leveling agents 18, and wherein embodiments layers 16 and 17 are inseparable layers.

Therefore, in an embodiment of the present disclosure there is provided a transfer assist member, such as a blade comprised of TAB check film with a resistance of from about $1 \times 10^7$ to about $9.9 \times 10^9$ ohm, a resistance of from about $1 \times 10^7$ to about $10 \times 10^9$ ohm, or a resistance of from about $1 \times 10^8$ to about $9.7 \times 10^9$ ohm as measured with a Resistance Meter, comprised of a partially conductive, formaldehyde free crosslinked mixture of an epoxy resin and carboxylated polyester overcoat contained on a supporting substrate, and where the overcoat can further include a conductive component such as carbon black, metal oxides or mixed metal oxides, conducting polymers such as polyaniline, polythiophene or polypyrrole, a catalyst, a silicone or fluoro leveling agent, a plasticizer, a silica and a fluoropolymer, and where the transfer assist member is, for example, from 1 to about 10 layers, from about 2 to about 10 layers, from about 2 to about 8 layers, from 2 to about 5 layers, from about 3 to about 7 layers, or from about 3 to about 5 layers.

Supporting Substrates

Various supporting substrates, such as substrate layer 17, can be selected for the transfer assist members disclosed herein, examples of which are polycarbonates, polyesters, polysulfones, polyamides, polyimides, polyamideimides, polyetherimides, polyolefins, polystyrenes, polyvinyl halides, polyvinylidene halides, polyphenyl sulfides, polyphenyl oxides, polyaryl ethers, polyether ether ketones, polyethylene terephthalate polymers (PET), polyethylene naphthalates, mixtures thereof, and the like.

Suitable polyester substrate examples include MYLAR®, MELINEX®, TEIJIN®, TETORON®, and TEONEX®, considered to be bi-axially oriented polyester films, which are commercially available in a variety of finishes and thicknesses. These and other similar polymers are available from E.I. DuPont Company or SKC Incorporated.

Polycarbonate polymer supporting substrate examples that can be selected include poly(4,4'-isopropylidene-diphenylene) carbonate (also referred to as bisphenol-A-polycarbonate), poly(4,4'-cyclohexylidine diphenylene) carbonate (also referred to as bisphenol-Z-polycarbonate), poly(4,4'-isopropylidene-3,3'-dimethyl-diphenyl) carbonate (also referred to as bisphenol-C-polycarbonate), and the like. In embodiments, the polymer supporting substrates are comprised of bisphenol-A-polycarbonate resins, commercially available as MAKROLON® or FPC® with, for example, a weight average molecular weight of from about 50,000 to about 500,000, or from about 225,000 to about 425,000.

Polysulfone supporting substrate examples selected for the disclosed members include polyphenylsulfones such as RADEL® R-5000NT, and 5900NT, polysulfones such as UDEL® P-1700, P-3500, and polyethersulfones such as RADEL® A-200A, AG-210NT, AG-320NT, VERADEL® 3000P, 3100P, 3200P, all available or obtainable from Solvay Advanced Polymers, LLC, Alpharetta, Ga.

Polyphenylene sulfide supporting substrate polymers that can be selected for the disclosed members include RYTON®, a polyphenylene sulfide, available from Chevron Phillips as a crosslinked polymer; FORTRON®, a polyphenylene sulfide available from Ticona Incorporated as a linear polymer, and SULFAR®, a polyphenylene sulfide available from Testori Incorporated.

Supporting substrate polyamide polymers that can be selected for the disclosed transfer assist members include aliphatic polyamides, such as Nylon 6 and Nylon 66 available from DuPont, semi-aromatic polyamides, or polyphthalamides such as TROGAMID® 6T available from Evonik Industries and aromatic polyamides, or aramides, such as KEVLAR® and NOMEX® available from DuPont, and TEIJINCONEX®, TWARON® and TECHNORA® available from Teijin Incorporated.

Examples of polyether ether ketone polymers that can be selected for the disclosed members supporting substrates include VICTREX® PEEK 90G, 150G, 450G, 150FC30, 450FC30, 150FW30, 450FE20, WG101, WG102, ESD101, all available from VICTREX Manufacturing Limited.

Polyamideimide examples that can be selected for the disclosed members supporting substrates include TORLON® AI-10 ($T_g$=272° C.), commercially available from Solvay Advanced Polymers, LLC, Alpharetta, Ga.

Examples of polyetherimide polymers that can be selected as supporting substrates for the disclosed members, where $T_g$ represents the glass transition temperature as determined by a number of known methods, and more specifically by Differential Scanning calorimetry (DSC), include ULTEM® 1000 ($T_g$=210° C.), 1010 ($T_g$=217° C.), 1100 ($T_g$=217° C.), 1285, 2100 ($T_g$=217° C.), 2200 ($T_g$=217° C.), 2210 ($T_g$=217° C.), 2212 ($T_g$=217° C.), 2300 ($T_g$=217° C.), 2310 ($T_g$=217° C.), 2312 ($T_g$=217° C.), 2313 ($T_g$=217° C.), 2400 ($T_g$=217° C.), 2410 ($T_g$=217° C.), 3451 ($T_g$=217° C.), 3452 ($T_g$=217° C.), 4000 ($T_g$=217° C.), 4001 ($T_g$=217° C.), 4002 ($T_g$=217° C.), 4211 ($T_g$=217° C.), 8015, 9011 ($T_g$=217° C.), 9075, and 9076, all commercially available from Sabic Innovative Plastics.

Examples of polyimide polymers that can be selected as supporting substrates for the disclosed members include P84® polyimide available from HP Polymer Inc., Lewisville, Tex.

The substrate can be of a number of different thicknesses, such as from about 25 to about 250 microns, from about 50 to about 200 microns, or from about 75 to about 150 microns, and where the check film total thickness is, for example, from about 1 to about 10 mils, from about 1 to about 8 mils, from about 1 to about 5 mils, from about 2 to about 4 mils, and more specifically, about 3.8 mils to about 4 mils, which thicknesses can be measured by known means such as a Permascope.

Epoxy Resins

Epoxy resins, present in various effective amounts, such as from about 20 about 80 weight percent, or from about 30 to about 70 weight percent of the crosslinked polymer mixture, include polymers having two or more epoxy groups per molecule, such as biphenyl epoxy resins, bisphenol epoxy resins, stilbene epoxy resins, phenol novolak epoxy resins, cresol novolak epoxy resins, triphenolmethane epoxy resins, alkyl-modified triphenolmethane epoxy resins, triazine nucleus-containing epoxy resins, dicyclopentanediene-modified phenol epoxy resins, phenolaralkyl epoxy resins with phenylene or diphenylenes, epoxy resins that contain functional groups, such as glycidyl ether, glycidyl ester and other oxirane moieties, epoxy resins formed by reacting epichlorohydrin with bisphenol A to form diglycidyl ethers of bisphenol A, bisphenol F, glycidyl epoxy resins and cycloaliphatic epoxides, cycloaliphatic epoxides that contain one or more cycloaliphatic rings in the molecule to which an oxirane ring is fused, (3,4-epoxycyclohexylmethyl-3,4-epoxycyclohexane carboxylate), glycidylamine epoxy resins, optionally mixtures thereof, and the like.

Specific examples of epoxy resins selected for the formation of the disclosed crosslinked mixture are a bisphenol A glycidyl ether, derived from the reaction of epichlorohydrin and bisphenol A with the following structure/formula, available from Dow Chemical Company as D.E.R.™ 317 (epoxide equivalent weight of 192-203 gram/equivalents), D.E.R.™ 331 (epoxide equivalent weight of 182 to 192 gram/equivalents), and the like

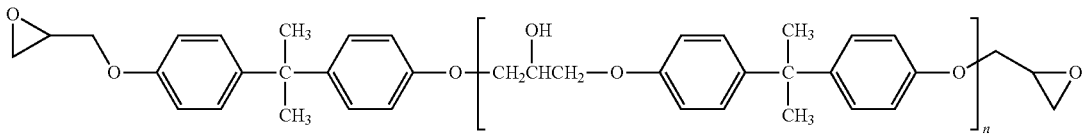

wherein n represents the number of repeating segments, and is, for example, a number of from about 1 to about 100, from about 1 to about 50, from about 2 to about 50, from about 3 to about 100, from about 4 to about 75, from about 3 to about 15, or from about 4 to about 10.

Further examples of epoxy resins that can be selected for the disclosed crosslinked mixture include epoxy Novolac resins, a reaction product of epichlorohydrin and phenol-formaldehyde Novolac such as D.E.N.™ 439 (epoxide equivalent weight of 191 to 210 gram/equivalents), D.E.N.™ 438 (epoxide equivalent weight of 176 to 181 gram/equivalents), and the like, available from Dow Chemical Company. The epoxy resin is present in an amount of from about 20 about 80 weight percent, or from about 30 to about 70 weight percent of the crosslinked polymer overcoat layer.

Carboxylated Polyesters

Examples of carboxylated polyesters selected for the crosslinked mixture include the appropriate URALAC® series of resins obtainable from DSM Coating Resins, Augusta, Ga.; KINTE® carboxylated polyesters, available from Guangzhou Kinte Industrial Company, Ltd., China, and mixtures thereof, and carboxylated polyesters available from Inopol Company, Ltd., South Korea as ALYMERS®.

A specific example of a carboxylated polyester selected for the crosslinked polymer layer is URALAC® P3250 obtainable from DSM Coating Resins, comprised for example, of the reaction product of about 12 mol percent of diethylene glycol, about 36 mol percent of neopentyl glycol, about 48 mol percent of terephthalic acid, and about 4 mol percent of trimellitic acid, and with an acid value of from about 70 to about 85 mg KOH/g, a glass transition temperature ($T_g$) of about 55° C., a weight average molecular weight ($M_w$) of about 6,900, and a number average molecular weight of ($M_n$) of about 2,400. Other URALAC® carboxylated polyester resins that can be incorporated into the crosslinked mixture include P2450 with an acid value of from about 32 to about 38 mg KOH/g, and a glass transition temperature ($T_g$) of about 68° C.; P5042 with an acid value of from about 52 to about 58 mg KOH/g, and a glass transition temperature ($T_g$) of about 57° C.; P5142 with an acid value of from about 69 to about 79 mg KOH/g, and a glass transition temperature ($T_g$) of about 58° C.; P541 with an acid value of from about 26 to about 30 mg KOH/g, and a glass transition temperature ($T_g$) of about 54° C., mixtures thereof, and the like.

KINTE® carboxylated polyesters that can be incorporated in the crosslinked mixture include HH-2582 with an acid value of from about 65 to about 75 mg KOH/g, and a glass transition temperature ($T_g$) of about 55° C.; HH-2782 with an acid value of from about 29 to about 35 mg KOH/g, and a glass transition temperature ($T_g$) of about 60° C.; HH-2685 with an acid value of from about 45 to about 55 mg KOH/g, and a glass transition temperature ($T_g$) of about 55° C.; NH-3386 with an acid value of from about 30 to about 36 mg KOH/g, and a glass transition temperature ($T_g$) of about 64° C.; NH-3383 with an acid value of from about 30 to about 36 mg KOH/g, and a glass transition temperature ($T_g$) of about 65 to about 68° C.; NH-3306 with an acid value of from about 30 to about 36 mg KOH/g, and a glass transition temperature ($T_g$) of about 69° C., and the like.

ALYMERS® carboxylated polyesters that can be incorporated in the crosslinked mixture layer include HC-7801, comprised for example, of reaction products of about 7 mol percent of diethylene glycol, about 42 mol percent of neopentyl glycol, about 43 mol percent of terephthalic acid, about 5 mol percent of isophthalic acid, and about 2 mol percent of adipic acid and with an acid value of from about 28 to about 38 mg KOH/g, and a glass transition temperature ($T_g$) of about 62° C.; HC-7002 with an acid value of from about 27 to about 35 mg KOH/g, and a glass transition temperature ($T_g$) of about 58° C., and the like.

The carboxylated polyester is present in various effective amounts, such as for example, from about 20 about 80 weight percent, or from about 30 to about 70 weight percent of the crosslinked mixture.

Optional Catalysts

A number of catalysts can be selected for the crosslinked mixture member layer and for the formation thereof, and which catalysts can function to assist in and accelerate the crosslinking of the epoxy resin and the carboxylated polyester mixture. Examples of catalysts utilized are amines, phosphoniums, and metal complexes.

Specific examples of amine catalysts include 2-ethylimidazole, tetramethyl guanidine, 2-ethylhexylamine, benzyltrimethyl ammonium hydroxide, mixtures thereof, and the like.

Examples of phosphonium catalysts are tetrabutyl phosphonium bromide, pentamethylene bis(triphenyl phosphonium bromide), tetramethylene bis(triphenyl phosphonium chloride), tetramethylene bis(triphenyl phosphonium iodide), tetramethylene bis(triphenyl phosphonium bromide), pentamethylene bis(triphenyl phosphonium chloride), pentamethylene bis(triphenyl phosphonium iodide), pentamethylene bis(triphenyl phosphonium bromide), hexamethylene bis(triphenyl phosphonium iodide), hexamethylene bis(triphenyl phosphonium bromide), heptamethylene bis(triphenyl phosphonium chloride), heptamethylene bis(triphenyl phosphonium iodide), heptamethylene bis(triphenyl phosphonium bromide), tetramethylene bis(triphenyl phosphonium acetate.acetic acid complex), pentamethylene bis(triphenyl phosphonium acetate.acetic acid complex), hexamethylene bis(triphenyl phosphonium acetate.acetic acid complex), heptamethylene bis(triphenyl phosphonium acetate.acetic acid complex), tetramethylene bis(triphenyl phosphonium phosphate), pentamethylene bis(triphenyl phosphonium phosphate), hexamethylene bis(triphenyl phosphonium phosphate), heptamethylene bis(triphenyl phosphonium phosphate), tetramethylene bis(triphenyl phosphonium)bicarbonate, pentamethylene bis(triphenyl phosphonium)bicarbonate, hexamethylene bis(triphenyl phosphonium)bicarbonate, heptamethylene bis(triphenyl phosphonium)bicarbonate, tetramethylene bis(triphenyl phosphonium)oxalate, pentamethylene bis(triphenyl phosphonium)oxalate, hexamethylene bis(triphenyl phosphonium)oxalate heptamethylene bis(triphenyl phosphonium)oxalate, and mixtures thereof.

Also, there can be selected as catalysts known metal complexes like zinc complexes available from King Industries, Inc. of Norwalk, Conn., such as the NACURE® catalysts, such as NACURE® XC-259 and XC-9206.

The amount of catalyst used is, for example, from about 0.01 to about 10 weight percent, from about 0.1 to about 8 weight percent, from about 1 to about 5 weight percent, or from about 1 to about 3 weight percent based on the solids present. The primary purposes of the catalysts are to assist with curing and in the crosslinking of the disclosed mixture of the epoxy resins and the carboxylated polyesters. More specifically, the crosslinking reactions of glycidyl ethers, glycidyl esters, and other oxirane functional resins with carboxyl or anhydride functional compounds and polymers can be accelerated in the presence of a catalyst.

Subsequent to curing in the presence of a catalyst, which can be accomplished quickly, such as from about 5 to about 20 minutes, and more specifically about 10 minutes, of the mixture of the epoxy resins and the carboxylated polyesters there results a crosslinked product, and where the curing can be accomplished by heating at temperatures equal to or exceeding about 80° C. for extended time periods. More specifically, the curing of the disclosed resin mixture can be accomplished at various suitable temperatures, such as for example, from about 80° C. to about 220° C., or from about 100° C. to about 180° C. for a period of, for example, from about 1 to about 120 minutes, or from about 3 to about 40 minutes. There results a crosslinked product of the epoxy resins and the carboxylated polyesters, and where the crosslinked value is, for example, as illustrated herein, such as from about 40 to about 100 percent, from about 50 to about 95 percent, from about 75 to about 100 percent, from about 80 to about 100 percent, from about 80 to about 100 percent, or from about 80 to about 98 percent, and which crosslinking percentage was determined by Fourier Transform Infrared Spectroscopy (FTIR).

The crosslinked mixture of the epoxy resins and the carboxylated polyesters are present in the disclosed transfer assist members in a number of differing effective amounts, such as for example, a total of 100 percent in those situations when no conductive components and other optional components, such as plasticizers and silicas, are present, from about 90 to about 99 weight percent, from about 80 to about 90 weight percent, from about 65 weight percent to about 100 weight percent, from about 65 to about 75 weight percent, or from about 50 to about 60 weight percent providing the total percent of components present is about 100 percent, and wherein the weight percent is based on the total solids, such as the solids of the epoxy resins and the carboxylated polyesters, the conductive component or filler, the plasticizer when present, silica when present, leveling agent when present, catalyst when present, and the fluoropolymers when present.

The crosslinked containing mixture of the epoxy resins and the carboxylated polyesters layer can be included in a number of thicknesses, depending, for example, on the thicknesses of the other layers that may be present and the components present in each layer, which thicknesses are, for example, from about 0.1 to about 50 microns, from about 1 to about 40 microns, or from about 5 to about 20 microns, as determined by known means such as a Permascope.

Optional Conductive Components

The crosslinked mixture containing layer can further comprise optional conductive components, such as known carbon forms like carbon black, graphite, carbon nanotubes, fullerene, graphene, and the like; metal oxides, mixed metal oxides, conducting polymers, such as polyaniline, polythiophene, polypyrrole, mixtures thereof, and the like.

Examples of carbon black conductive components that can be selected for incorporation into the crosslinked epoxy resin and carboxylated polyester mixture layer illustrated herein include Ketjenblack® carbon blacks available from AkzoNobel Functional Chemicals, special black 4 (B.E.T. surface area=180 m$^2$/g, DBP absorption=1.8 ml/g, primary particle diameter=25 nanometers) available from Evonik-Degussa, special black 5 (B.E.T. surface area=240 m$^2$/g, DBP absorption=1.41 ml/g, primary particle diameter=20 nanometers), color black FW1 (B.E.T. surface area=320 m$^2$/g, DBP absorption=2.89 ml/g, primary particle diameter=13 nanometers), color black FW2 (B.E.T. surface area=460 m$^2$/g, DBP absorption=4.82 ml/g, primary particle diameter=13 nanometers), color black FW200 (B.E.T. surface area=460 m$^2$/g, DBP absorption=4.6 ml/g, primary particle diameter=13 nanometers), all available from Evonik-Degussa; VULCAN® carbon blacks, REGAL® carbon blacks, MONARCH® carbon blacks, EMPEROR® carbon blacks, and BLACK PEARLS® carbon blacks available from Cabot Corporation. Specific examples of conductive carbon blacks are BLACK PEARLS® 1000 (B.E.T. surface area=343 m$^2$/g, DBP absorption=1.05 ml/g), BLACK PEARLS® 880 (B.E.T. surface area=240 m$^2$/g, DBP absorption=1.06 ml/g), BLACK PEARLS® 800 (B.E.T. surface area=230 m$^2$/g, DBP absorption=0.68 ml/g), BLACK PEARLS® L (B.E.T. surface area=138 m$^2$/g, DBP absorption=0.61 ml/g), BLACK PEARLS® 570 (B.E.T. surface area=110 m$^2$/g, DBP absorption=1.14 ml/g), BLACK PEARLS® 170 (B.E.T. surface area=35 m$^2$/g, DBP absorption=1.22 ml/g), EMPEROR® 1200, EMPEROR® 1600, VULCAN® XC72 (B.E.T. surface area=254 m$^2$/g, DBP absorption=1.76 ml/g), VULCAN® XC72R (fluffy form of VULCAN® XC72), VULCAN® XC605, VULCAN® XC305, REGAL® 660 (B.E.T. surface area=112 m$^2$/g, DBP absorption=0.59 ml/g), REGAL® 400 (B.E.T. surface area=96 m$^2$/g, DBP absorption=0.69 ml/g), REGAL® 330 (B.E.T. surface area=94 m$^2$/g, DBP absorption=0.71 ml/g), MONARCH® 880 (B.E.T. surface area=220 m$^2$/g, DBP absorption=1.05 ml/g, primary particle diameter=16 nanometers), and MONARCH® 1000 (B.E.T. surface area=343 m$^2$/g, DBP absorption=1.05 ml/g, primary particle diameter=16 nanometers); special carbon blacks available from Evonik Incorporated; and Channel carbon blacks available from Evonik-Degussa. Other known suitable carbon blacks not specifically disclosed herein may be selected as the filler or conductive component.

Examples of polyaniline conductive components that can be selected are PANIPOL™ F, commercially available from Panipol Oy, Finland, and known lignosulfonic acid grafted polyanilines. These polyanilines usually have a relatively small particle size diameter of, for example, from about 0.5 to about 5 microns, from about 1.1 to about 2.3 microns, or from about 1.5 to about 1.9 microns.

Metal oxide conductive components that can be selected include, for example, tin oxide, antimony doped tin oxide, indium oxide, indium tin oxide, zinc oxide, titanium oxides, mixtures thereof, and the like.

When present, the conductive component or conductive components can be selected in an amount of, for example, from about 1 to about 70 weight percent, from about 3 to about 40 weight percent, from about 4 to about 30 weight percent, from about 10 to about 30 percent, from about 3 to about 30 weight percent, from about 8 to about 25 weight percent, or from about 13 to about 20 weight percent of the total solids of the crosslinked mixture and the conductive component or filler.

Optional Plasticizers

Optional plasticizers, which can be considered plasticizers that primarily increase the plasticity or fluidity of the polymer mixture materials selected for the disclosed transfer assist member components, include diethyl phthalate, dioctyl phthalate, diallyl phthalate, polypropylene glycol dibenzoate, di-2-ethyl hexyl phthalate, diisononyl phthalate, di-2-propyl heptyl phthalate, diisodecyl phthalate, di-2-ethyl hexyl terephthalate, and other known suitable plasticizers. The plasticizers can be utilized in various effective amounts, such as for example, from about 0.1 to about 30 weight percent, from about 1 to about 20 weight percent, or from about 3 to about 15 weight percent based on the solids present.

Optional Silicas

Optional silica examples selected for the disclosed transfer assist member components, and which can contribute to the wear resistant properties of the members and blades illustrated herein include silica, fumed silicas, surface treated silicas, other known silicas, such as AEROSIL R972®, mixtures thereof, and the like. The silicas are selected in various effective amounts, such as for example, from about 0.1 to about 20 weight percent, from about 1 to about 15 weight percent, and from about 2 to about 10 weight percent based on the solids present.

Optional Fluoropolymers

Optional fluoropolymers and particles thereof that can be selected for the disclosed transfer assist member crosslinked mixture, and that can contribute to the wear resistant properties of the members and blades illustrated herein, include tetrafluoroethylene polymers (PTFE), trifluorochloroethylene polymers, hexafluoropropylene polymers, vinyl fluoride polymers, vinylidene fluoride polymers, difluorodichloroethylene polymers, or copolymers thereof. The fluoropolymers are selected in various effective amounts, such as for example, from about 0.1 to about 20 weight percent, from about 1 to about 15 weight percent, and from about 2 to about 10 weight percent based on the solids present.

Optional Leveling Agents

Optional leveling agent examples, which can contribute to the smoothness characteristics, such as enabling smooth coating surfaces with minimal or no blemishes or protrusions, of the members and blades illustrated herein include silicones, such as epoxy-modified silicones (dual-end type), X-22-163C with a reported functional group equivalent weight of 2,700 g/mol, available from Shin-Etsu Silicones; polysiloxane polymers or fluoropolymers. The optional polysiloxane polymers include, for example, a polyester modified polydimethylsiloxane with the trade name of BYK® 310 (about 25 weight percent in xylene) and BYK® 370 (about 25 weight percent in xylene/alkylbenzenes/cyclohexanone/monophenylglycol=75/11/7/7); a polyether modified polydimethylsiloxane with the trade name of BYK® 333, BYK® 330 (about 51 weight percent in methoxypropylacetate) and BYK® 344 (about 52.3 weight percent in xylene/isobutanol=80/20), BYK®-SILCLEAN 3710 and 3720 (about 25 weight percent in methoxypropanol); a polyacrylate modified polydimethylsiloxane, with the trade name of BYK®-SILCLEAN 3700 (about 25 weight percent in methoxypropylacetate); or a polyester polyether modified polydimethylsiloxane with the trade name of BYK® 375 (about 25 weight percent in di-propylene glycol monomethyl ether), all commercially available from BYK Chemical. The leveling agents are selected in various effective amounts, such as for example, from about 0.01 to about 5 weight percent, from about 0.1 to about 3 weight percent, and from about 0.2 to about 1 weight percent based on the solids present.

Optional Adhesives

Optional adhesive layers designated, for example, as 6pa, 7pa, 8pa, and 9pa in FIG. 3, can be included between each of the member layers, partially included at the edges between each of the member layers, or on the vertical sides between the substrate side of layer 1pa and layer 2pa, layers 2pa and 3pa, layers 3pa and 4pa, and on the horizontal sides between layer 4pa and the overcoat top layer 5pa. The horizontal sides of layers 1pa, 2pa, 3pa and 4pa are usually not bonded together.

A number of known adhesives can be selected for each adhesive layer, inclusive of suitable polyesters, a 3M™ Double Coated Tape 444, which is, for example, about 3.9 mils thick in one form, a 300 high tack acrylic adhesive with, for example, a 0.5 mil thick polyester carrier, white densified Kraft paper liner (55 lbs), mixtures thereof, and the like.

The adhesive layer thicknesses which can vary are each of an effective thickness of, for example, from about 1 to about 50 millimeters, from about 10 to about 40 millimeters, or from about 15 to about 25 millimeters.

To Wear Resistant Layer

The top or wear resistant layer, which can be bonded, designated for example, by the numeral 5pa, illustrated in FIG. 3, can be comprised of various suitable known and commercially available materials, such as polyolefins like ultra-high molecular weight polyethylenes (UHMW), a wear-resistant plastic with a low coefficient of friction, excellent impact strength, and possessing chemical and moisture resistance. UHMW wear resistant layer materials comprise long chains of polyethylene of the formula/structure illustrated below, which usually aligns in the same direction, and which can derive its protective characteristics mostly from the length of each individual molecule (chain)

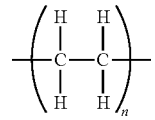

wherein n represents the number of repeating segments of at least about 100,000, and more specifically, from about 100,000 to about 300,000, or from about 150,000 to about 225,000.

The thickness of the disclosed wear resistant layer can vary depending, for example, on the thicknesses of the other layers that may be present and the components in each layer. Thus, for example, the thicknesses of the wear resistant layer can vary from about 1 to about 20 mils, from about 1 mil to about 15 mils, from about 2 to about 10 mils, or from about 1 mil to about 5 mils as determined by known means such as a Permascope.

Solvents

Examples of solvents selected for formation of the members illustrated herein, especially for the formation of the dispersions of the crosslinked mixture of the epoxy resin and a carboxylated polyester, which solvents can be selected in an amount of, for example, from about 60 to about 95 weight percent, or from about 70 to about 90 weight percent of the total mixture components weight, include alkylene halides, such as methylene chloride, tetrahydrofuran, toluene, monochlorobenzene, N-methyl-2-pyrrolidone, N,N-dimethylformamide, N,N-dimethylacetamide, methyl ethyl ketone, dimethylsulfoxide (DMSO), methyl isobutyl ketone, formamide, acetone, ethyl acetate, cyclohexanone, acetanilide, tetrahydrofuran, mixtures thereof, and the like. Diluents that can be mixed with the solvents in amounts of, for example, from about 1 to about 25 weight percent, and from 1 to about 10 weight percent based on the weight of the solvent, and the diluent is known diluents like aromatic hydrocarbons, ethyl acetate, acetone, cyclohexanone and acetanilide.

Also included within the scope of the present disclosure are methods of imaging and printing with the transfer assist members and check films illustrated herein. These methods generally involve the formation of an electrostatic latent image on the imaging member, followed by developing the image with a toner composition comprised, for example, of a thermoplastic resin, a colorant, such as a pigment, dye, or mixtures thereof, a charge additive, internal additives like waxes, and surface additives, such as for example silica, coated silicas, aminosilanes, and the like, reference U.S. Pat. Nos. 4,560,635 and 4,338,390, the disclosures of each of these patents being totally incorporated herein by reference, subsequently transferring with the disclosed transfer assist member the toner image to a suitable image receiving substrate, and permanently affixing the image thereto. In those environments wherein a printing mode is selected, the imaging method involves the same operation with the exception that exposure can be accomplished with a laser device or image bar. More specifically, the transfer assist members disclosed herein can be selected for the Xerox Corporation iGEN® machines, inclusive of the iGenF, that generate with some versions over 120 copies per minute. Processes of imaging, especially xerographic imaging and printing, including digital and/or color printing, are thus encompassed by the present disclosure.

Specific embodiments will now be described in detail. These examples are intended to be illustrative, and not limited to the materials, conditions, or process parameters set forth in these embodiments. All parts are percentages by solid weight unless otherwise indicated. The disclosed molecular weights, such as $M_w$ (weight average) and $M_n$ (number average), can be measured by a number of known methods, and more specifically, by Gel Permeation Chromatography (GPC).

Example I

There was prepared a transfer assist blade check film as follows:

Preparation of a Partially Conductive Coating Dispersion

There was prepared a dispersion by mixing D.E.R.™ 317, an epoxy resin available from Dow Chemicals, and comprised of a bisphenol A glycidyl ether, derived from the reaction of epichlorohydrin and bisphenol A with the following structure/formula

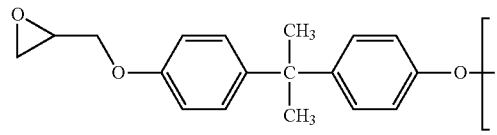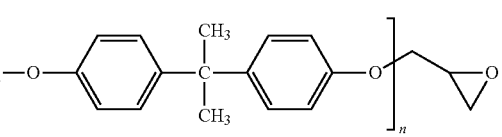

and with an epoxide equivalent weight of about 192 to about 203 grams/equivalents, and wherein n is a number of about 4, and URALAC® P3250, a carboxylated polyester available from DSM (Koninkijke DSM N.V., or Royal DSM of Holland), and which URALAC® P3250 was comprised of the reaction product of 12 mol percent of diethylene glycol, 36 mol percent of neopentyl glycol, 48 mol percent of terephthalic acid and 4 mol percent of trimellitic acid, and with acid value of about 70 to about 85 mg KOH/g, a glass transition temperature ($T_g$) of 55° C., a weight average molecular weight ($M_w$) of 6,900, and a number average molecular weight ($M_n$) of 2,400, a catalyst of 2-ethylimidazole and a silicone epoxide leveling agent available as X-22-163C from Shin-Etsu Silicone, in a weight ratio of about 49.4/49.4/1/0.2 in tetrahydrofuran (THF), about 20 weight percent solids, via agitation to obtain a polymeric base solution.

EMPEROR® E1200, (a carbon black available from Cabot Company), was then added to the above prepared polymeric base solution. The resulting mixture was ball milled with 2 millimeter diameter stainless steel shots at 200 rpm for 20 hours. Thereafter, the resulting coating dispersion comprised of URALAC® P3250, epoxy D.E.R.™ 317, EMPEROR® E1200, 2-methylimidazole, X-22-163C in a weight ratio 46.6/46.6/5.7/0.9/0.2 of THF, about 21 weight percent solids, was then separated from the steel shots by filtration through a 20 micron NYLON cloth filter to obtain the final coating dispersion.

Subsequently, the above prepared resulting final coating dispersion was deposited and coated on a 4 mil thick PET supporting substrate via either a lab draw bar coater or a production extrusion coater, followed by curing the coating at 140° C. for 10 minutes to obtain a flat oriented check film comprised of the above prepared 15 micron thick crosslinked mixture layer present on the 4 thick mil PET substrate.

The resistance of the above prepared member, where the crosslinked mixture was free of formaldehyde, was measured to be about $4.7 \times 10^8$ ohm using a Trek Model 152-1 Resistance Meter, and was very uniform across the entire 2.5 inch× 17 inch (the dimension of the real blade petal assembly) sample strip. Furthermore, the adhesion between the disclosed crosslinked containing mixture layer and the PET substrate was excellent, did not peel when subjected to adhesion testing with an in house device, possessed excellent wear resistant characteristics and very good hand rubbing resistance where there was essentially no adverse developed image defects visually noticed.

Preparation of the Petal Assembly (Blade Material Comprising Five Layers for the Transfer Assist Member)

The above prepared disclosed check film, 15 microns thick, on the 4 mil thick PET, polyethylene terephthalate polymer layer, and three separate 5 mil thick MYLAR® PET films were cut into 4 millimeter by 38 millimeter strips, and the strips were aligned in the sequence of MYLAR® PET film, MYLAR® PET film, and MYLAR® PET film, with the disclosed check film PET substrate facing the MYLAR® PET film. Each adjacent pair of the aforementioned layers were bonded together using 3M™ Double Coated Tape 444 in between from the edges of the long sides to about 2.5 millimeters inside. The partially bonded layers were folded rendering the 2.5 millimeter wide bonded layers into a vertical position and the 1.5 millimeter wide unbounded layers into a horizontal position.

Thereafter, there was applied with a lab draw bar coater to the above prepared member a wear resistant coating of UHMW polyethylene, obtained from E.I. DuPont, believed to be of the following formula/structure

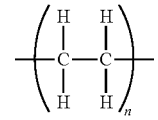

wherein n represents the number of repeating segments of from about 150,000 to about 225,000, and which wear resistant layer was then bonded to the horizontal section of the top MYLAR® PET film. The horizontal sections of the above layers were then cut into about 40 smaller segments with rectangular shapes.

Preparation of the Transfer Assist Member Assembly

The aluminum extruded element, such as element 1 of FIG. 1, was then attached to the above transfer assist member petal assembly, and then attached to the transfer assist member stainless steel clamp assembly, and the transfer assist member aluminum rivet illustrated herein.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. A transfer assist member comprising a plurality of layers, one of said layers being a check film layer comprised of a crosslinked mixture of a conductive component, an epoxy resin and a carboxylated polyester, and wherein said epoxy resin is represented by the following formula/structure

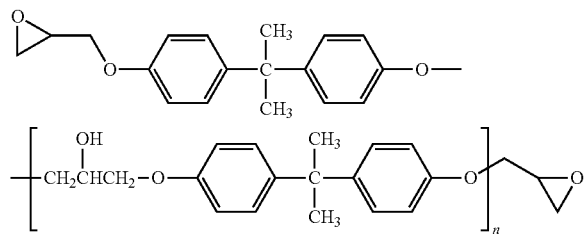

wherein n represents the number of segments, and is a number of from about 1 to about 100.

2. A transfer assist member in accordance with claim 1 wherein said conductive component is carbon black.

3. A transfer assist member in accordance with claim 1 wherein said crosslinked mixture layer further includes a silicone leveling agent, or a fluoro leveling agent, a plasticizer, a silica, a fluoropolymer, or mixtures thereof.

4. A transfer assist member in accordance with claim 1 further including a polymer supporting layer comprised of a polyester, a polyamide, a polyetherimide, a polyamideimide, a polyimide, a polyphenyl sulfide, a polyether ether ketone, a polysulfone, a polycarbonate, a polyvinyl halide, a polyolefin, or mixtures thereof.

5. A transfer assist member in accordance with claim 1 further including a polymer supporting layer comprised of a polyethylene terephthalate.

6. A transfer assist member in accordance with claim 1 wherein said conductive component is carbon black, graphite, metal oxide, polyaniline, polythiophene, polypyrrole, or mixtures thereof, and further including silica, polytetrafluoroethylene, a catalyst, and a plasticizer, and which member further includes a polymer support layer comprised of a polyethylene terephthalate or a polyethylene naphthalate.

7. A transfer assist member in accordance with claim 6 wherein said plasticizer is selected from the group consisting of at least one of diethyl phthalate, dioctyl phthalate, diallyl phthalate, polypropylene glycol dibenzoate, di-2-ethyl hexyl phthalate, diisononyl phthalate, di-2-propyl heptyl phthalate, diisodecyl phthalate, and di-2-ethyl hexyl terephthalate.

8. A transfer assist member in accordance with claim 1 wherein the plurality of layers is from about 2 to about 10 layers.

9. A transfer assist member in accordance with claim 1 wherein said epoxy resin is a bisphenol A glycidyl ether derived from the reaction of epichlorohydrin and bisphenol A.

10. A transfer assist member in accordance with claim 1 wherein n for said epoxy resin is from about 2 to about 50, and which member further comprises a wear resistant layer of a polyethylene as represented by the following formula/structure

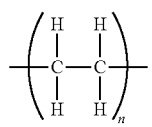

wherein n for said wear resistant layer represents the number of repeating segments.

11. A transfer assist member in accordance with claim 1 wherein said carboxylated polyester is present in an amount of from about 20 weight percent to about 80 weight percent of the solids, and the epoxy resin is present in an amount such as from about 20 about 80 weight percent of the crosslinked polymer mixture.

12. A transfer assist member in accordance with claim 1 wherein said carboxylated polyester is comprised of the reaction product of diethylene glycol, neopentyl glycol, terephthalic acid, and trimellitic acid.

13. A composite toner transfer assist blade comprising a plurality of bonded layers inclusive of a bonded check film layer comprised of a crosslinked layer mixture of epoxy resins and carboxylated polyesters contained on a polymer layer substrate of a polyalkylene terephthalate, a polyester, or mixtures thereof, wherein said epoxy resin is a bisphenol A glycidyl ether derived from the reaction of epichlorohydrin and bisphenol A, and said carboxylated polyester is comprised of reaction products of diethylene glycol, neopentyl glycol, terephthalic acid and trimellitic acid, and further including conductive components, catalysts, optional silicas, leveling agents, optional plasticizers, and optional fluoropolymer particles of tetrafluoroethylene polymers, trifluorochloroethylene polymers, hexafluoropropylene polymers, vinyl fluoride polymers, vinylidene fluoride polymers, difluorodichloroethylene polymers, polysiloxane polymers, and mixtures thereof.

14. A transfer assist blade in accordance with claim 13 wherein said plurality of layers are comprised of three polyester layers situated between and in contact with said check film and said polymer substrate, and further including a wear resistant layer comprised of a polyethylene as represented by the following formula/structure

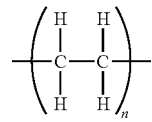

wherein n represents the number of repeating segments of from about 100,000 to about 300,000.

15. A transfer assist blade in accordance with claim 13 with a resistance of from about $1 \times 10^7$ to about $10 \times 10^9$ ohm, and wherein said crosslinked mixture is present in an amount of from about 65 to about 100 weight percent based on the total solids, said crosslinked layer mixture being of a thickness of from about 0.1 to about 50 microns, said conductive component being present in an amount of from about 3 to about 40 weight percent, said silica being present in an amount of from about 2 to about 10 weight percent, said plasticizer being present in an amount of from about 3 to about 15 weight percent, said fluoropolymer particles being present in an amount of from about 2 to about 10 weight percent, said leveling agents being present in an amount of from about 0.01 to about 5 weight percent, and said layer mixture has a crosslinked value of from about 75 to about 100 percent.

16. A xerographic process for providing substantially uniform contact between a copy substrate and a toner developed image located on an imaging member, comprising providing said contact by using a toner transfer flexible assist blade that comprises a plurality of adhesive bonded layers, wherein said flexible transfer assist blade is adapted to move from a non-operative position spaced from the imaging member to an operative position in contact with the copy substrate on the imaging member, applying pressure against the copy substrate in a direction toward the imaging member, and wherein said plurality of layers comprises at least one of a check film layer comprised of a crosslinked mixture of epoxy resins and carboxylated polyesters present on a polymer substrate of a polyalkylene terephthalate, a polyester, or mixtures thereof, and said crosslinked epoxy resins and carboxylated polyesters mixture layer further includes at least one of a conductive component, a silica, a plasticizer, a catalyst of an amine, a phosphonium, a zinc complex or mixtures thereof, a fluoropolymer, a leveling agent and mixtures thereof, and optionally curing said mixture thereby resulting in a crosslinking value of from about 75 to about 100 percent.

17. A transfer assist member in accordance with claim 1 further including a wear resistant layer comprised of a polyethylene as represented by the following formula/structure

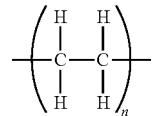

wherein n represents the number of repeating segments.

18. A transfer assist member in accordance with claim 1 further including a catalyst selected from the group consisting of 2-ethylimidazole, tetramethyl guanidine, 2-ethylhexylamine, and benzyltrimethyl ammonium hydroxide.

19. A transfer assist member in accordance with claim 1 further including a catalyst of a phosphonium salt or a metal complex.

20. A transfer assist member in accordance with claim 1 further including a catalyst selected from the group consisting of tetrabutyl phosphonium chloride tetrabutyl phosphonium bromide, and tetrabutyl phosphonium fluoride, and the metal complexes of zinc.

* * * * *